Sept. 21, 1965 S. ZAROMB 3,207,631
BATTERY
Filed Jan. 26, 1962
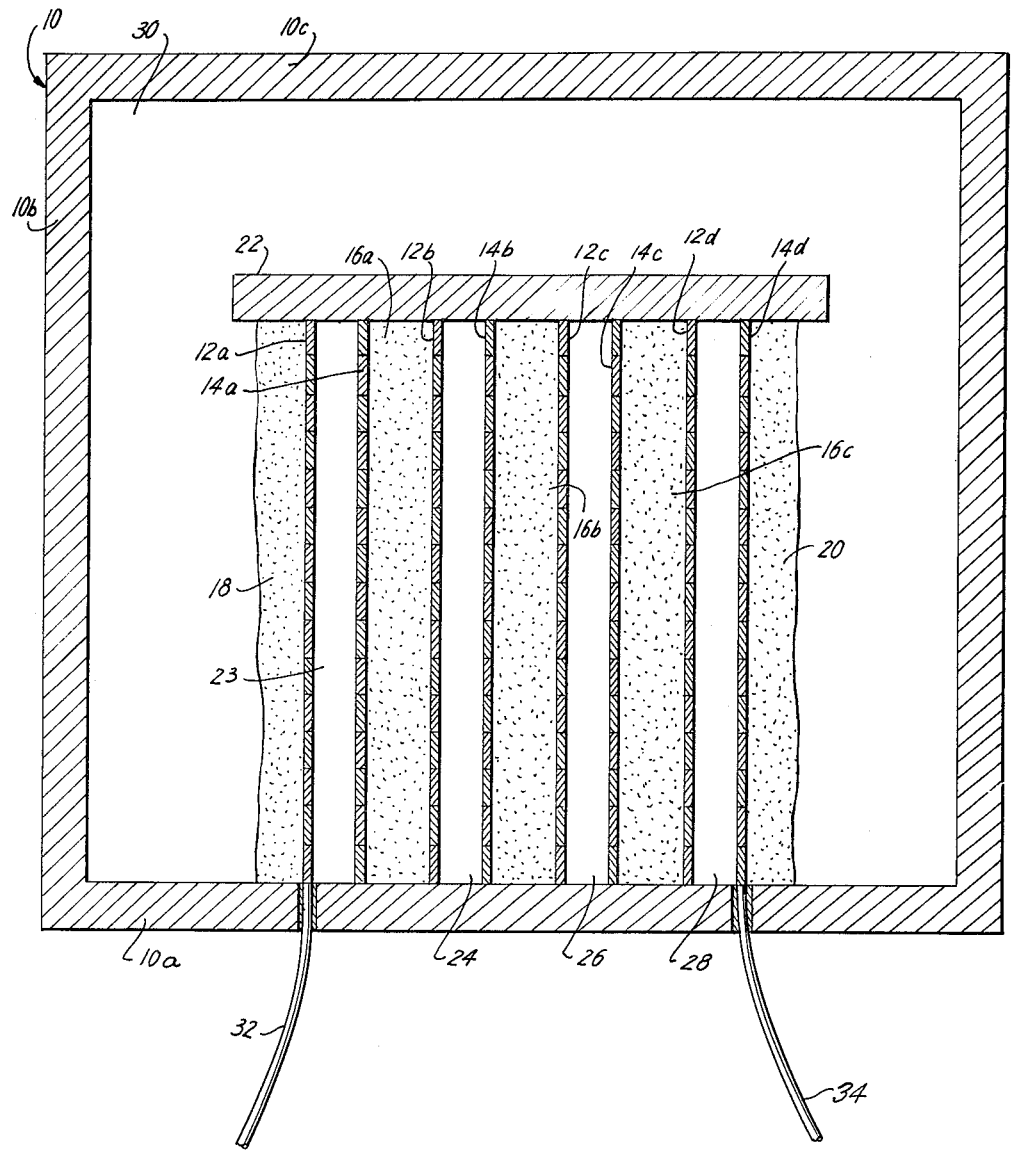

United States Patent Office 3,207,631
Patented Sept. 21, 1965

3,207,631
BATTERY
Solomon Zaromb, Baltimore, Md.
(1125 E. 102nd St., Brooklyn 36, N.Y.)
Filed Jan. 26, 1962, Ser. No. 168,929
2 Claims. (Cl. 136—10)

This invention relates to improvements in battery constructions.

It is an object of the invention to provide an improved construction for high current density batteries.

A further object of the invention is to provide for improved gas mobility in batteries such as, for example, the improved transfer of oxygen from NiO to Cd in Ni–Cd batteries.

A still further object of the invention is to avoid the consequences of wafer-thin electrodes which are employed to minimize weight and volume.

Yet another object of the invention is to provide for the simplified mounting of electrodes in batteries.

Still another object of the invention is to simplify the operation of making electrical contact with the electrodes of a battery.

To achieve the above and other of its objectives, the invention contemplates a battery structure wherein there is employed a serial rather than a parallel arrangement of electrodes.

Furthermore, in accordance with a feature of the invention selected of the electrodes of each bipolar pair are spaced by a porous body impregnated with a gas-pervious, water-impermeable material to provide for the transfer of a gas such as oxygen between adjacent electrodes during an electrolytic process.

The above objects as well as features and advantages of the invention will be better understood from the following detailed description of a preferred embodiment as illustrated in the accompanying drawing in which the sole figure diagrammatically represents, partly in section, a battery structure contemplated within the scope of the invention.

In the drawing is shown a battery comprising a casing 10 which is of a gas and liquid impermeable material such as a glass, plastic, metal or the like and which has suitable structural strength in accordance with the ultimate use intended for the said battery.

Within the chamber enclosed by the casing 10 are arranged two series of interspersed electrodes respectively of materials which are electrolytically related in order to provide for the generation of electrical current.

One of said series of electrodes comprises electrodes 12a, 12b, 12c and 12d. These electrodes are composed of a grid of material having suitable strength such as, for example, copper and are filled with an active material such as, for example, porous cadmium.

The other series of electrodes includes electrode 14a, 14b, 14c and 14d and these electrodes are also fabricated of a material having suitable strength and may, for example, be composed of copper grids filled, for example, with porous nickel oxide or the like.

Although it has been indicated that a battery of the invention may consist of cadmium and nickel oxide electrodes, the invention applies as well to any high current density type of battery of low weight and volume such as, for example, the zinc-silver oxide and cadmium-silver oxide types and other such types as well.

With respect to the electrodes the inner electrodes of the series are arranged in bipolar pairs. For example, electrode 14a is paired with electrode 12b, electrode 14b is paired with electrode 12c and electrode 14c is paired with electrode 12d.

Electrodes 12a and 14d constitute the endmost or outer electrodes of the series and are the electrodes, as will be shown, to which electrical connection is made.

Between the individual electrodes of each pair are arranged bodies of porous electrically conducting material impregnated with a gas-pervious water impermeable material. The bodies of such material between the inner electrodes are indicated by reference characters 16a, 16b and 16c.

Bodies of this material are also arranged on the outer faces of the endmost electrodes 12a and 14d, these bodies being indicated respectively at 18 and 20.

The porous bodies may be, for example, porous or sintered copper which is impregnated with Teflon emulsion or with a water repellent paraffin or any other suitable water repellent material.

The aforenoted electrodes are generally in vertical alignment arranged on the bottom 10a of the casing 10 which is otherwise provided with sides 10b and top 10c.

Within the casing 10 is arranged a water impermeable electrically insulating cover 22 which along with bodies 10, 18 and 20 afford a water tight enclosure within which are arranged the electrodes defining therebetween the spaces 23, 24, 26 and 28. In said spaces is positioned a liquid electrolyte which, for example, may be constituted by a potassium hydroxide or sodium hydroxide solution.

Within the casing 10 is defined a chamber 30 located between the said casing and the water tight enclosure constituted by cover 22 and porous bodies 18 and 20 which are impregnated with a water impermeable material. In the chamber 30 is located an oxygen containing gas such as air or perhaps even pure or commercially pure oxygen.

Finally, to complete the structure there are provided electrically conductive leads 32 and 34 which are respectively connected to the endmost electrodes or grids 12a and 14d. It is to be noted in this respect that these leads are connected solely to the endmost electrodes, there being no parallel electrical arrangement as in conventional types of batteries so that the flow of current through the battery of the invention is a series type of flow in accordance with which it is necessary for the current to flow, for example, from electrode 14d through the electrolyte in space 28 to electrode 12d and thence through porous body 16c to electrode 14c and so forth. There is no electrical connection between the electrodes since the cover 22 is of an electrically insulating material and, therefore, the flow of current along the comparatively thin electrodes is avoided and the electrical resistance thereof constitutes no factor in the generation of electrical power by the battery of the invention.

It will be observed that the porous bodies 16 provide for the flow of oxygen between the electrodes while, at the same time, restricting the position of the electrolyte to pre-determined spaces between the pairs of electrodes.

From what has been stated above, it will be seen that there has been provided a solution for the main problem in the technology of Ni–Cd batteries and the like with respect to the transfer of oxygen from the NiO to the Cd upon overcharge.

It should be noted that the grids supporting the reacting material of each pair of electrodes and the separating non-reacting conducting material can all be composed of a single grid or grid structure, thereby simplifying the manufacture of such batteries.

There will now be obvious to those skilled in the art many modifications and variations of the structure set forth above. These modifications and variations will not depart from the scope of the invention if defined by the following claims.

What is claimed is:
1. A battery comprising a plurality of spaced electrodes alternately consisted at least in part by different porous electrochemically active materials, said electrodes with the exception of the endmost electrodes being arranged in pairs, each pair constituting a bipolar electrode, electrically conducting gas-pervious, porous, electrolyte repellent structures between the electrodes of said pairs, said bipolar electrodes defining spaces with each other and with the endmost electrodes, means enclosing said spaces, and an electrolyte in said spaces.

2. A battery comprising a casing, a plurality of spaced grids within said casing alternately constituted at least in part by different porous electrochemically active materials, said grids with the exception of the endmost grids being arranged in pairs, each pair constituting a bipolar electrode, electrically conducting, porous, gas-pervious, water repellant structures between the grids of said pairs and on and exterior of said endmost grids, said bipolar electrodes defining spaces with each other and with the endmost grids, a water impermeable electrically insulating cover over said grids, said cover, casing and grids enclosing said spaces, an electrolyte in said spaces, and leads extending through said casing and connected to said endmost grids.

References Cited by the Examiner

UNITED STATES PATENTS

| | | | |
|---|---|---|---|
| 627,009 | 6/99 | Paget | 136—12 |
| 1,285,660 | 11/18 | Ford | 136—11 |
| 2,471,781 | 5/49 | Schmidt | 136—12 |
| 2,693,499 | 11/54 | Neumann | 136—177 |
| 3,003,013 | 10/61 | Duddy | 136—9 |
| 3,087,003 | 4/63 | Drengler et al. | 136—10 |

FOREIGN PATENTS 439,917  12/35  Great Britain.

WINSTON A. DOUGLAS, *Primary Examiner.*
JOHN H. MACK, *Examiner.*